US012747782B2

(12) United States Patent
Yan et al.

(10) Patent No.: US 12,747,782 B2
(45) Date of Patent: Sep. 29, 2026

(54) COOLING STRUCTURE FOR A MOTORCYCLE TRANSMISSION

(71) Applicant: ZHEJIANG QIANJIANG MOTORCYCLE CO., LTD., Zhejiang (CN)

(72) Inventors: Yangyi Yan, Taizhou City (CN); Haigang Zheng, Taizhou City (CN); Licheng Zhang, Taizhou City (CN); Lai Jiang, Taizhou City (CN); Jiangwei Pan, Taizhou City (CN)

(73) Assignee: Zhejiang Qianjiang Motorcycle Co., Ltd., Taizhou City (CN)

( * ) Notice: Subject to any disclaimer, the term of this patent is extended or adjusted under 35 U.S.C. 154(b) by 113 days.

(21) Appl. No.: 18/995,447

(22) PCT Filed: Jul. 4, 2023

(86) PCT No.: PCT/CN2023/105634
§ 371 (c)(1),
(2) Date: Jan. 16, 2025

(87) PCT Pub. No.: WO2024/027446
PCT Pub. Date: Feb. 8, 2024

(65) Prior Publication Data

US 2026/0251212 A1 Aug. 27, 2026

(30) Foreign Application Priority Data

Aug. 2, 2022 (CN) ........................ 202210923255.X

(51) Int. Cl.
*F16H 57/04* (2010.01)
*F16H 57/035* (2012.01)

(52) U.S. Cl.
CPC ....... *F16H 57/0416* (2013.01); *F16H 57/035* (2013.01); *F16H 57/0489* (2013.01)

(58) Field of Classification Search
CPC . F16H 57/0416; F16H 57/035; F16H 57/0489
See application file for complete search history.

(56) References Cited

U.S. PATENT DOCUMENTS 2,205,975 A * 6/1940 Heyer ................. F16H 57/0489 474/45
2,511,479 A * 6/1950 Olah ......................... F16H 1/16 165/47

(Continued)

FOREIGN PATENT DOCUMENTS

CN 1497185 A 5/2004
CN 101038027 A 9/2007

(Continued)

OTHER PUBLICATIONS

International Search Report of PCT/CN2023/105634.

*Primary Examiner* — Henry Y Liu
(74) *Attorney, Agent, or Firm* — Minder Law Group; Lly H. Wong

(57) ABSTRACT

A cooling structure for a motorcycle transmission includes a heat dissipation fan disposed inside a transmission housing, an inner wall of the transmission housing is provided with a flow-guiding groove directly opposite to the heat dissipation fan and a labyrinth partition adjacent to a rear side of the flow-guiding groove, an air inlet communicating with the flow-guiding groove is formed in a side wall of a front end of the flow-guiding groove, a groove bottom of the flow-guiding groove is provided with an arc-shaped flow-guiding slope, a head end of the flow-guiding slope is located at the air inlet, the flow-guiding slope is gradually inclined toward a direction close to the heat dissipation fan from the head end to a tail end, and a lower end of the labyrinth partition is spaced from a bottom edge of the transmission housing to form an air passing opening.

10 Claims, 7 Drawing Sheets

(56) References Cited

U.S. PATENT DOCUMENTS

| | | | | |
|---|---|---|---|---|
| 3,467,177 | A * | 9/1969 | Hoddinott | F16H 57/0489 165/47 |
| 4,422,498 | A * | 12/1983 | Chen | B23Q 11/14 165/47 |
| 5,101,924 | A * | 4/1992 | Yamagiwa | F16H 9/18 180/230 |
| 6,338,688 | B1 * | 1/2002 | Minami | F16H 57/035 474/146 |
| 7,487,853 | B2 * | 2/2009 | Ishida | F16H 57/0489 180/230 |
| 7,546,892 | B2 * | 6/2009 | Lan | B62J 50/30 180/68.1 |
| 7,771,299 | B2 * | 8/2010 | Mochizuki | F16H 9/18 180/358 |
| 8,439,019 | B1 * | 5/2013 | Carlson | F02B 33/44 123/559.3 |
| 8,911,312 | B2 * | 12/2014 | Itoo | F16H 57/0489 474/93 |
| 9,366,331 | B2 * | 6/2016 | Eberhardt | F16H 9/12 |
| 9,863,523 | B2 * | 1/2018 | Stocks | F16H 9/14 |
| 10,066,728 | B2 * | 9/2018 | Yolitz | F16H 57/0006 |
| 10,197,149 | B2 * | 2/2019 | Kuji | F16H 57/0416 |
| 10,295,045 | B2 * | 5/2019 | Eberhardt | F16H 57/0416 |
| 10,315,510 | B2 * | 6/2019 | Toupin | F16H 57/0489 |
| 10,648,554 | B2 * | 5/2020 | Kuhl | F16H 57/0489 |
| 10,697,532 | B2 * | 6/2020 | Schleif | F16H 57/031 |
| 10,738,875 | B2 * | 8/2020 | Stocks | F16H 9/14 |
| 10,738,876 | B2 * | 8/2020 | Eberhardt | F16H 9/12 |
| 10,774,921 | B2 * | 9/2020 | Ijichi | F16H 57/0489 |
| 10,995,843 | B2 * | 5/2021 | Bessho | F16H 57/035 |
| 11,293,540 | B2 * | 4/2022 | Leclair | F02M 35/162 |
| 11,306,815 | B2 * | 4/2022 | Kuhl | F16H 57/0489 |
| 11,391,361 | B2 * | 7/2022 | Leclair | F16H 57/0489 |
| 11,492,939 | B2 * | 11/2022 | Tajima | B60K 13/04 |
| 11,543,005 | B2 * | 1/2023 | Zurbruegg | F16H 9/14 |
| 11,578,793 | B2 * | 2/2023 | Nelson | F16H 57/027 |
| 11,644,093 | B2 * | 5/2023 | Eberhardt | F16H 57/0416 474/144 |
| 11,649,889 | B2 * | 5/2023 | Nelson | F16H 57/027 474/93 |
| 11,698,126 | B1 * | 7/2023 | Hamada | F16H 57/029 74/606 R |
| 11,879,542 | B2 * | 1/2024 | Kuhl | F16H 57/0489 |
| 12,007,014 | B2 * | 6/2024 | Nelson | F16H 57/027 |
| 12,055,208 | B2 * | 8/2024 | Leclair | B60K 11/06 |
| 12,072,018 | B2 * | 8/2024 | Kuhl | F16H 57/0489 |
| 12,078,237 | B2 * | 9/2024 | Yamada | B62D 25/20 |
| 12,092,198 | B2 * | 9/2024 | Nelson | F16H 57/027 |
| 12,504,070 | B2 * | 12/2025 | Truskolaski | F16H 61/12 |
| 12,644,513 | B2 * | 6/2026 | Kuhl | F16H 57/0489 |
| 2006/0270503 | A1 * | 11/2006 | Suzuki | F16H 57/0415 474/93 |
| 2007/0023217 | A1 * | 2/2007 | Ishida | F16H 57/0415 180/219 |
| 2008/0264707 | A1 * | 10/2008 | Lan | B62J 50/30 180/339 |
| 2010/0167853 | A1 * | 7/2010 | Morita | F16H 9/18 474/144 |
| 2012/0289370 | A1 * | 11/2012 | Yamanishi | B60K 17/08 474/93 |
| 2013/0090198 | A1 * | 4/2013 | Itoo | F16H 57/03 474/93 |
| 2018/0222311 | A1 * | 8/2018 | Toupin | F02M 35/10157 |
| 2019/0078679 | A1 * | 3/2019 | Leclair | F16H 57/0416 |
| 2019/0120366 | A1 * | 4/2019 | Leclair | F02M 35/162 |
| 2022/0042434 | A1 * | 2/2022 | Tajima | F16H 9/18 |
| 2022/0316579 | A1 * | 10/2022 | Leclair | B60K 11/06 |
| 2023/0341029 | A1 * | 10/2023 | Nakamura | B60K 17/08 |

FOREIGN PATENT DOCUMENTS

| | | | |
|---|---|---|---|
| CN | 102951242 | A | 3/2013 |
| CN | 103895505 | A | 7/2014 |
| CN | 204592254 | U | 8/2015 |
| CN | 204739201 | U | 11/2015 |
| CN | 105864409 | A | 8/2016 |
| CN | 107076292 | A | 8/2017 |
| CN | 107848411 | A | 3/2018 |
| CN | 210317512 | U | 4/2020 |
| CN | 111120067 | A | 5/2020 |
| CN | 210530990 | U | 5/2020 |
| CN | 210637486 | U | 5/2020 |
| CN | 112172985 | A | 1/2021 |
| CN | 213414066 | U | 6/2021 |
| CN | 216715191 | U | 6/2022 |
| CN | 115285275 | A | 11/2022 |
| JP | 2008240562 | A | 10/2008 |
| TW | 201017010 | A1 | 5/2010 |

* cited by examiner

COOLING STRUCTURE FOR A MOTORCYCLE TRANSMISSION

RELATED APPLICATIONS

This application claims priority to PCT Patent Application No. PCT/CN2023/105634 filed Jul. 4, 2023 and China Patent Application No. CN202210923255.X filed Aug. 2, 2022.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

TECHNICAL FIELD

The present disclosure belongs to the technical field of motorcycles, and relates to a cooling structure for a motorcycle transmission.

BACKGROUND

A continuously variable transmission (CVT) is a transmission device that employs a belt, a driving pulley and a driven pulley that cooperate to transmit power to achieve a continuous change in transmission ratio. For the CVT, the service life of the belt, the driving pulley and the driven pulley, and the transmission efficiency directly affect the operating effect of the transmission.

The CVT will generate more heat during operation, so how to efficiently dissipate heat of the CVT is crucial. In the prior art, cooling of components such as the belt of the CVT is usually achieved by disposing an air inlet in a transmission case cover while disposing fan blades on an outer side wall of the driving pulley, the driving pulley being connected to a power output shaft of an engine, the power output shaft of the engine driving the driving pulley to rotate, and then forcibly sucking air from the outside by means of the fan blades. For example, Chinese patent document discloses a side cover for a continuously variable transmission (CVT) (application number: CN201520169173.6, publication number: CN204739201U). The side cover is provided with an air inlet and an air outlet, and the air outlet is located at a side corresponding to a driven wheel of the CVT and close to a transmission end of the driven wheel. In the side cover, an air inlet passage protrudes from an outer surface of the side cover, and the air inlet passage is enlarged to ensure that sufficient cooling air enters the side cover, but after the cooling air enters the side cover, the cooling air is discharged from the air outlet relatively quickly, resulting in insufficient utilization of the cooling air and still insufficient cooling effect.

SUMMARY

For the above problems in the prior art, an object of the present disclosure is to propose a cooling structure for a motorcycle transmission, and the present disclosure solves the problem that the cooling effect of the existing cooling structure is insufficient.

The object of the present disclosure can be achieved by the following technical solution: provided is a cooling structure for a motorcycle transmission, the transmission including a transmission housing, the cooling structure including a heat dissipation fan disposed inside the transmission housing, wherein an inner wall of the transmission housing is provided with a flow-guiding groove directly opposite to the heat dissipation fan, an air inlet communicating with the flow-guiding groove is formed in a side wall of a front end of the flow-guiding groove, a groove bottom of the flow-guiding groove is provided with an arc-shaped flow-guiding slope, a head end of the flow-guiding slope is located at the air inlet, and the flow-guiding slope is gradually inclined toward a direction close to the heat dissipation fan from the head end to a tail end, the inner wall of the transmission housing is also provided with a labyrinth partition adjacent to a rear side of the flow-guiding groove, and a lower end of the labyrinth partition is spaced from a bottom edge of the transmission housing to form an air passing opening.

During operation of a motorcycle, outside air enters the transmission housing through the air inlet, and at this time, the heat dissipation fan plays a role in accelerating air suction. The air first enters the flow-guiding groove after passing through the air inlet, and since the labyrinth partition is disposed adjacent to the rear side of the flow-guiding groove, the labyrinth partition blocks a large amount of air inside the flow-guiding groove, and of course, part of the air can enter a rear end of the transmission housing through the air passing opening to cool a driven pulley. When the air flows within the flow-guiding groove, since the flow-guiding groove is provided with the flow-guiding slope, and the guide-guiding slope is arc-shaped and gradually inclined toward the direction close to the heat dissipation fan from the head end to the tail end, under the action of the flow-guiding slope, the air can form a rotating airflow in the flow-guiding groove to flow toward a driving pulley and the heat dissipation fan, thereby optimizing a wind field, greatly increasing the cooling time and the cooling intensity of the driving pulley, and improving the cooling effect. After the driving pulley is cooled, the temperature of the air rises to become hot air, and the hot air eventually enters the rear end of the transmission housing through the air passing opening, and at this time, the labyrinth partition can also make the hot air flow out as soon as possible, preventing the hot air from flowing back, thereby further ensuring that the transmission has a better cooling effect.

In the above cooling structure for a motorcycle transmission, the transmission housing is provided with a driving pulley, and the transmission housing includes an inner side cover and an outer side cover which are mutually snap-fitted, the flow-guiding groove and the air inlet are both located in the inner side cover, the groove bottom of the flow-guiding groove is provided with a first via hole, and an output shaft of an engine extends into the transmission housing through the first via hole and is fixedly connected with the driving pulley. This design enables the air entering from the air inlet to simultaneously cool a sealing structure or bearings at a position where the output shaft of the engine is connected to the first via hole, thereby improving the service life of the sealing structure and the bearings. In addition, the air inlet is located in the inner side cover and has a certain concealment, so that the aesthetics of the motorcycle can be increased.

In the above cooling structure for a motorcycle transmission, the groove bottom of the flow-guiding groove is provided with an annular projection arranged around the first via hole, the flow-guiding slope is arranged around the annular projection, the head end of the flow-guiding slope is located on a lower side of the annular projection, a top of the air inlet is opposite to the annular projection and a bottom of the air inlet is opposite to the head end of the flow-guiding slope. After the air enters the air inlet, since the top of the air inlet is directly opposite to the annular projection and the bottom of the air inlet is opposite to the head end of the flow-guiding slope, the annular projection will guide the air entering from the top of the air inlet to flow downwards to make the air flow as much as possible to the head end of the flow-guiding slope, thereby making the air form a rotating airflow better, improving the cooling effect.

In the above cooling structure for a motorcycle transmission, a front end of the inner side cover is provided with an air inlet pipe protruding relative to an outer side wall of the inner side cover, and an outlet of the air inlet pipe is the air inlet. A side wall, facing away from the outer side cover, of the inner side cover is the outer side wall of the inner side cover. The air inlet pipe protrudes relative to the outer side wall of the inner side cover so that in a limited space, the air inlet is maximized as much as possible to ensure a sufficient amount of air inlet, thereby improving the cooling effect.

In the above cooling structure for a motorcycle transmission, an inner side wall of the inner side cover is provided with a front side groove, the heat dissipation fan is embedded into the front side groove, the flow-guiding groove is disposed at a middle of a groove bottom of the front side groove, and the tail end of the flow-guiding slope is connected to the groove bottom of the front side groove. By disposing the front side groove and embedding the heat dissipation fan in the front side groove, the exhaust effect of the heat dissipation fan can be improved. Since the tail end of the flow-guiding slope is connected to the groove bottom of the front side groove, air flowing out of the flow-guiding groove enters the front side groove again, causing the air to rotationally flow in the front side groove again to further increase the cooling time, so that the driving pulley is better cooled.

In the above cooling structure for a motorcycle transmission, the transmission housing is further provided with a driven pulley, the inner side wall of the inner side cover is provided with an air guiding protrusion located on an upper side of the labyrinth partition and connected to an upper end of the labyrinth partition, the inner side wall of the inner side cover is further provided with a rear side groove opposite to the driven pulley, and the front side groove and the rear side groove are separated by the air guiding protrusion and the labyrinth partition. First, the design enables the air to rotationally flow in the front side groove better to improve the cooling effect of the driving pulley, and at the same time, the air guiding protrusion and the labyrinth partition together block hot air from flowing back to enable the hot air to flow out as soon as possible, thereby further ensuring a better cooling effect of the transmission.

In the above cooling structure for a motorcycle transmission, the labyrinth partition is arc-shaped, the front side groove is substantially circular, and the air guiding protrusion and a front side wall of the labyrinth partition are coplanar with a side wall of the front side groove. The design enables the air to flow in an arc-shaped trajectory against the side wall of the front side groove, so that the air in the front side groove can better form a rotating airflow to further increase the cooling time, so that the driving pulley is better cooled.

In the above cooling structure for a motorcycle transmission, the head end of the flow-guiding slope protrudes relative to an inner wall of the air inlet pipe, and the flow-guiding slope and the air inlet pipe are connected by an arc-shaped transition surface. Since the air inlet pipe protrudes relative to the outer side wall of the inner side cover, although the amount of air inlet is increased, air entering from the air inlet pipe is far away from the driving pulley. At this time, the provision of the arc-shaped transition surface has the effect of guiding the air to flow toward the driving pulley, thereby optimizing a flow path of the air and improving the cooling effect.

In the above cooling structure for a motorcycle transmission, a top of a rear end of the transmission housing is provided with an air outlet pipe and a bottom of the rear end of the transmission housing is provided with a water drain joint. The cooled air can be discharged from the air outlet pipe, and in rainy weather, moisture and impurities entrained in the air can be discharged from the water drain joint.

In the above cooling structure for a motorcycle transmission, an air guiding partition opposite to the labyrinth partition is disposed on an inner side wall of the outer side cover, an upper flanging is connected to a top edge of the outer side cover and a lower flanging is connected to a bottom edge of the outer side cover, a first upper arc-shaped partition plate and a second upper arc-shaped partition plate located at a rear side of the first upper arc-shaped partition plate are connected between an upper end of the air guiding partition and the upper flanging, a first lower arc-shaped partition plate and a second lower arc-shaped partition plate located at a rear side of the first lower arc-shaped partition plate are connected between a lower end of the air guiding partition and the lower flanging, inner concave surfaces of the first upper arc-shaped partition plate and the first lower arc-shaped partition plate are disposed toward a front side of the outer side cover, and inner concave surfaces of the second upper arc-shaped partition plate and the second lower arc-shaped partition plate are disposed toward a rear side of the outer side cover. The air guiding partition is opposite to the labyrinth partition, so the air guiding partition is matched with the labyrinth partition, which can increase the wind shielding effect, better block the hot air from flowing back, and make the hot air be discharged from the air outlet pipe as soon as possible, thereby further ensuring that the transmission has a better cooling effect. Meanwhile, on the basis of realizing the blocking function of the air guiding partition, since the inner concave surfaces of the first upper arc-shaped partition plate and the first lower arc-shaped partition plate are disposed toward the front side of the outer side cover, the wind blocked can also flow against the first upper arc-shaped partition plate and the first lower arc-shaped partition plate to form a rotating airflow, thereby optimizing a wind field, greatly increasing the cooling time and the cooling intensity of the driving pulley, and improving the cooling effect. Also, the inner concave surfaces of the second upper arc-shaped partition plate and the second lower arc-shaped partition plate are disposed toward the rear side of the outer side cover, so that the cooling intensity of the driven pulley can also be increased and the cooling effect can be improved.

Compared with the prior art, the cooling structure for a motorcycle transmission has the following advantages:

1. The flow-guiding groove is provided with the flow-guiding slope, and the guide-guiding slope is arc-shaped and gradually inclined toward the direction close to the heat dissipation fan from the head end to the tail end. Therefore, under the action of the flow-guiding slope, the air can form a rotating airflow in the flow-guiding groove to flow toward the driving pulley and the heat dissipation fan, thereby optimizing a wind field, greatly increasing the cooling time and the cooling intensity of the driving pulley, and improving the cooling effect.

2. The air inlet pipe protrudes relative to the outer side wall of the inner side cover so that in a limited space, the air inlet is maximized as much as possible to ensure a sufficient amount of air inlet, thereby improving the cooling effect.

3. The labyrinth partition is disposed adjacent to the rear side of the flow-guiding groove, and the labyrinth partition plate also enables the hot air to flow out as soon as possible, preventing the hot air from flowing back, thereby further ensuring a better cooling effect of the transmission.

Figure 1:
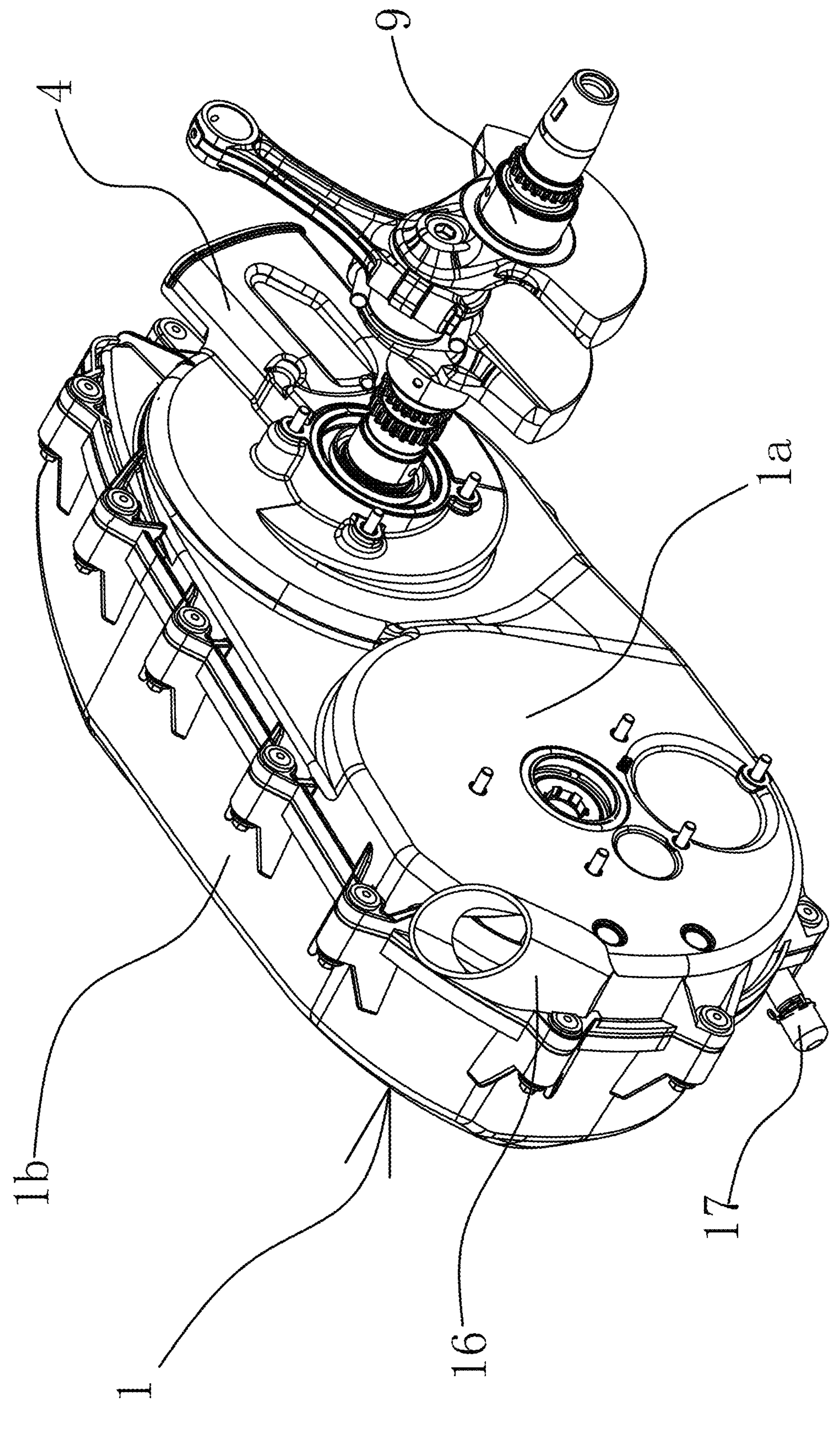
FIG. 1 is a structural diagram of a motorcycle transmission.

In the drawings, 1, transmission housing; 1*a*, inner side cover; 1*b*, outer side cover; 2, driving pulley; 21, heat dissipation fan; 3, flow-guiding groove; 4, air inlet pipe; 41, air inlet; 5, flow-guiding slope; 51, head end; 52, tail end; 6, labyrinth partition; 7, air passing opening; 8, first via hole; 9, output shaft; 10, annular projection; 11, front side groove; 12, driven pulley; 13, air guiding protrusion; 14, rear side groove; 15, arc-shaped transition surface; 16, air outlet pipe; 17, water drain joint; 18, air guiding partition; 19, upper flanging; 20, lower flanging; 21, first upper arc-shaped partition plate; 22, second upper arc-shaped partition plate; 23, first lower arc-shaped partition plate; and 24, second lower arc-shaped partition plate.

DETAILED DESCRIPTION

The following is a specific embodiment of the present disclosure and the technical solution of the present disclosure is further described with reference to the accompanying drawings, but the present disclosure is not limited to this embodiment.

Figure 2:
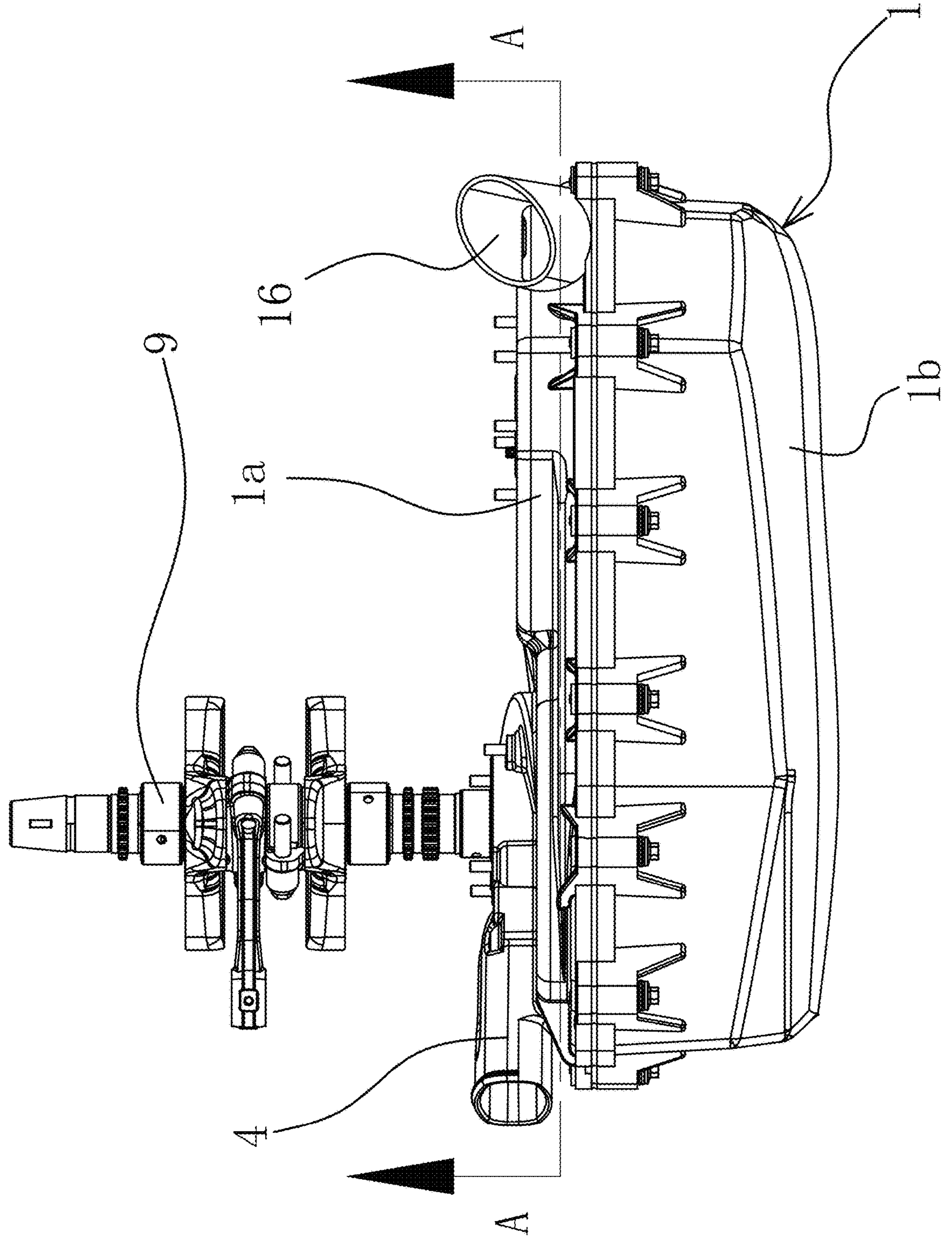
FIG. 2 is a top view of the motorcycle transmission.
Figure 3:
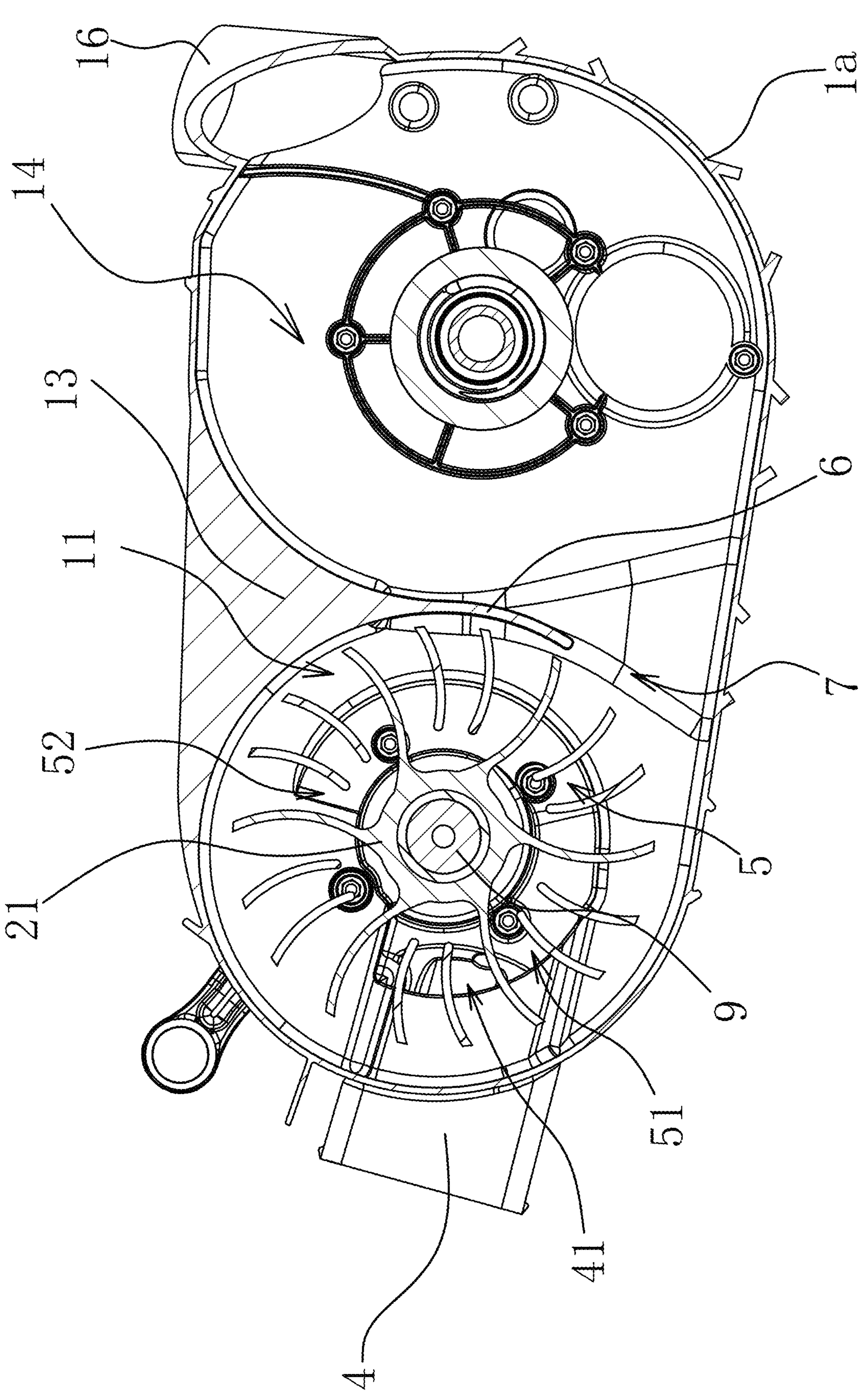
FIG. 3 is a cross-sectional view of A-A in FIG. 2.

As shown in FIGS. 1, 2 and 3, in a cooling structure for a motorcycle transmission, the transmission includes a transmission housing 1 and a driving pulley 2 located within the transmission housing 1, the transmission housing 1 includes an inner side cover 1*a* and an outer side cover 1*b* which are mutually snap-fitted, the cooling structure includes a heat dissipation fan 21 disposed on one end face of the driving pulley 2, an inner wall of the transmission housing 1 is provided with a flow-guiding groove 3 directly opposite to the heat dissipation fan 21, an air inlet 41 communicating with the flow-guiding groove 3 is formed in a side wall of a front end of the flow-guiding groove 3, a groove bottom of the flow-guiding groove 3 is provided with an arc-shaped flow-guiding slope 5, a head end 51 of the flow-guiding slope 5 is located at the air inlet 41, and the flow-guiding slope 5 is gradually inclined toward a direction close to the heat dissipation fan 21 from the head end 51 to a tail end 52, the inner wall of the transmission housing 1 is also provided with a labyrinth partition 6 adjacent to a rear side of the flow-guiding groove 3, and a lower end of the labyrinth partition 6 is spaced from a bottom edge of the transmission housing 1 to form an air passing opening 7, and a top of a rear end of the transmission housing 1 is provided with an air outlet pipe 16 and a bottom of the rear end of the transmission housing 1 is provided with a water drain joint 17. Cooled air can be discharged from the air outlet pipe 16, and moisture and impurities entrained in the air can be discharged from the water drain joint 17 in rainy weather. Specifically, a front end of the inner side cover 1*a* is provided with an air inlet pipe 4 protruding relative to an outer side wall of the inner side cover 1*a*, and an outlet of the air inlet pipe 4 is the air inlet 41. The air inlet pipe 4 protrudes relative to the outer side wall of the inner side cover 1*a* so that in a limited space, the air inlet 41 is maximized as much as possible to secure a sufficient amount of air inlet, thereby improving the cooling effect.

During operation of a motorcycle, outside air enters the transmission housing through the air inlet 41, and at this time, the heat dissipation fan 21 plays a role in accelerating air suction. The air first enters the flow-guiding groove 3 after passing through the air inlet 41, and the labyrinth partition 6 blocks a large amount of air inside the flow-guiding groove 3, and of course, part of the air can enter the rear end of the transmission housing 1 through the air passing opening 7 to cool a driven pulley 12. When the air flows within the flow-guiding groove 3, since the flow-guiding groove 3 is provided with the flow-guiding slope 5, and the guide-guiding slope 5 is arc-shaped and gradually inclined toward the direction close to the heat dissipation fan 21 from the head end 51 to the tail end 52, under the action of the flow-guiding slope 5, the air can form a rotating airflow in the flow-guiding groove 3 to flow toward a driving pulley 2 and the heat dissipation fan 21, thereby optimizing a wind field, greatly increasing the cooling time and the cooling intensity of the driving pulley 2, and improving the cooling effect. After the driving pulley 2 is cooled, the temperature of the air rises to become hot air, and the hot air eventually enters the rear end of the transmission housing 1 through the air passing opening 7, and at this time, the labyrinth partition 6 can also make the hot air flow out as soon as possible, preventing the hot air from flowing back, thereby further ensuring that the transmission has a better cooling effect.

Figure 4:
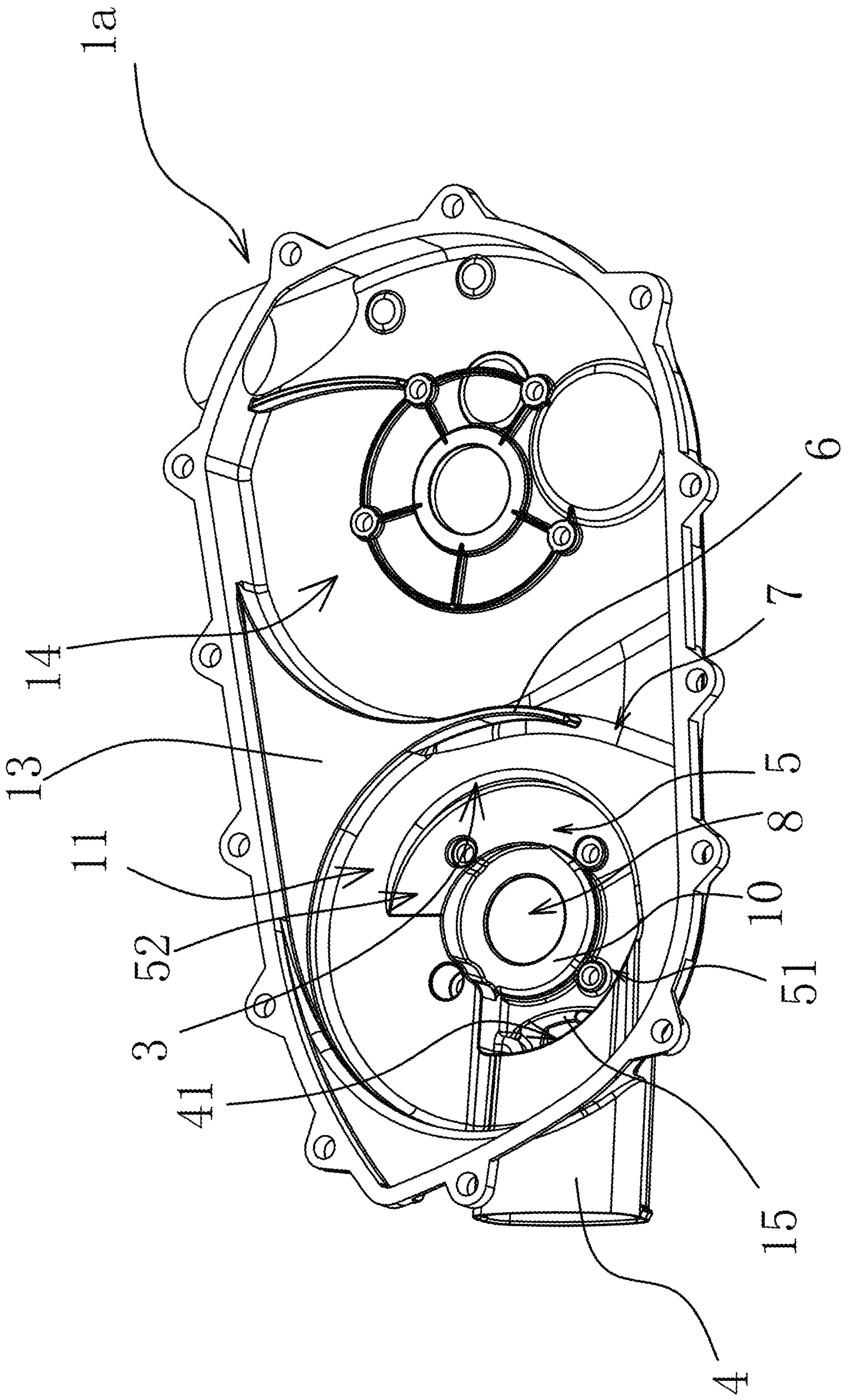
FIG. 4 is a structural diagram of an inner side cover.
Figure 5:
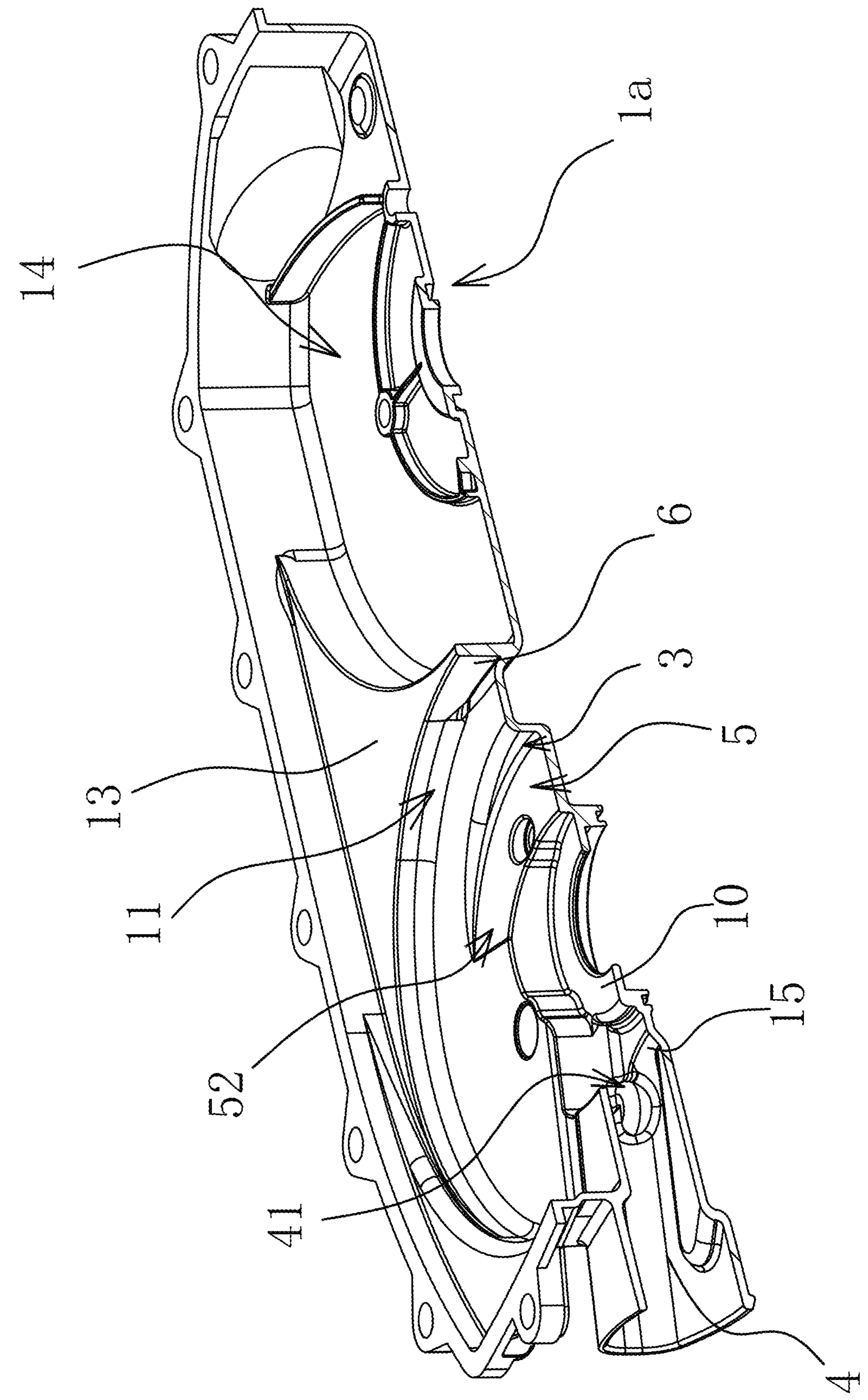
FIG. 5 is a perspective cross-sectional view of the inner side cover.

Further, as shown in connection with FIGS. 3, 4 and 5, the flow-guiding groove 3 and the air inlet 41 are both located in the inner side cover 1*a*, and the groove bottom of the flow-guiding groove 3 is provided with a first via hole 8, and an output shaft 9 of an engine extends into the transmission housing 1 through the first via hole 8 and is fixedly connected with the driving pulley 2. The groove bottom of the flow-guiding groove 3 is provided with an annular projection 10 arranged around the first via hole 8, the flow-guiding slope 5 is arranged around the annular projection 10, the head end 51 of the flow-guiding slope 5 is located on a lower side of the annular projection 10, a top of the air inlet 41 is directly opposite to the annular projection 10 and a bottom of the air inlet 41 is opposite to the head end 51 of the flow-guiding slope 5. As shown in FIG. 3, the top of the air inlet 41 is at an upper part and the bottom of the air inlet 41 is at a lower part. An inner side wall of the inner side cover 1*a* is provided with a front side groove 11, the heat dissipation fan 21 is embedded into the front side groove 11, the flow-guiding groove 3 is disposed at a middle of a groove bottom of the front side groove 11, and the tail end 52 of the flow-guiding slope 5 is connected to the groove bottom of the front side groove 11. The head end 51 of the flow-guiding slope 5 protrudes relative to an inner wall of the air inlet pipe 4, and the flow-guiding slope 5 and the air inlet pipe 4 are connected by an arc-shaped transition surface 15.

Figure 6:
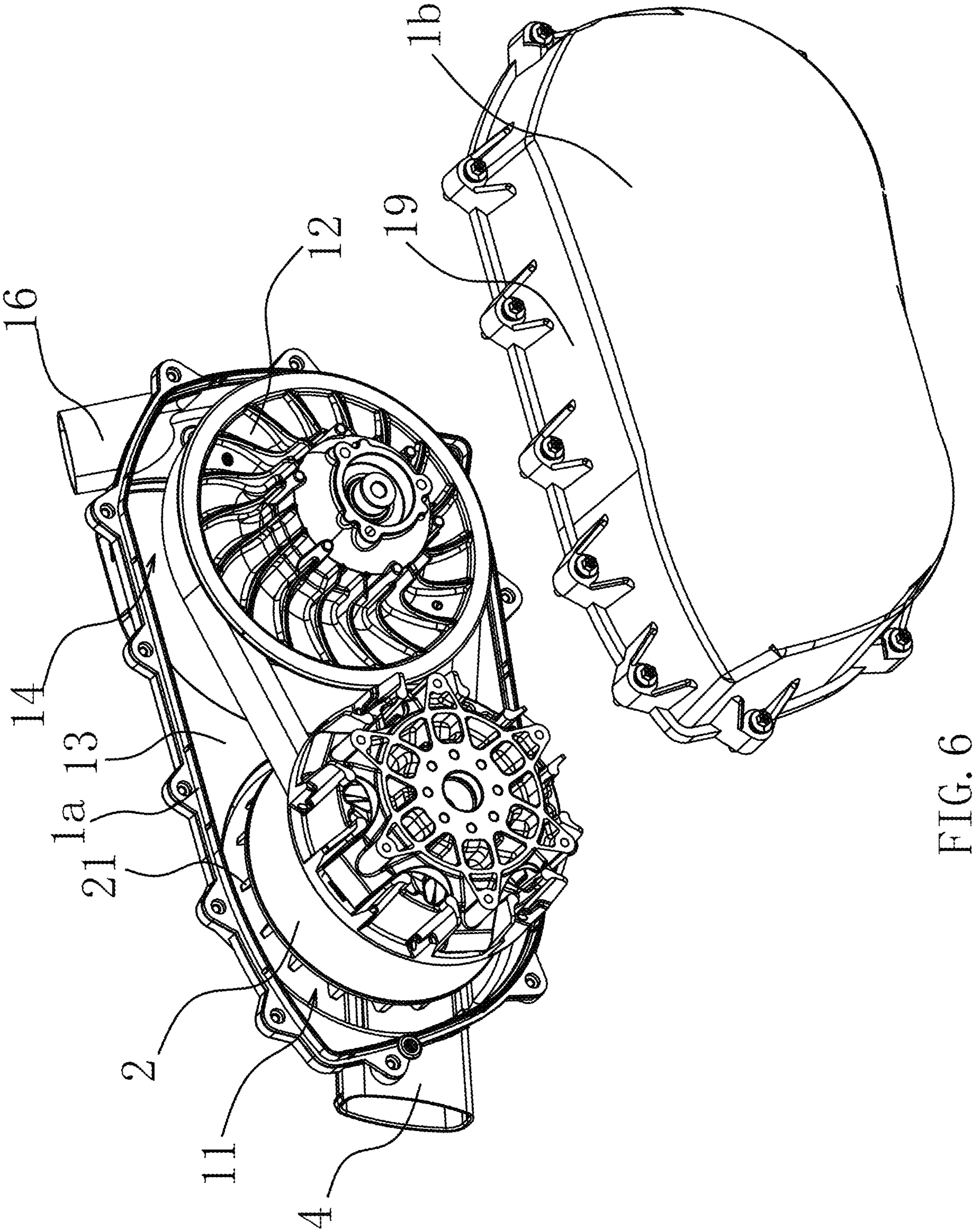
FIG. 6 is an exploded view of some parts of the motorcycle transmission.
Figure 7:
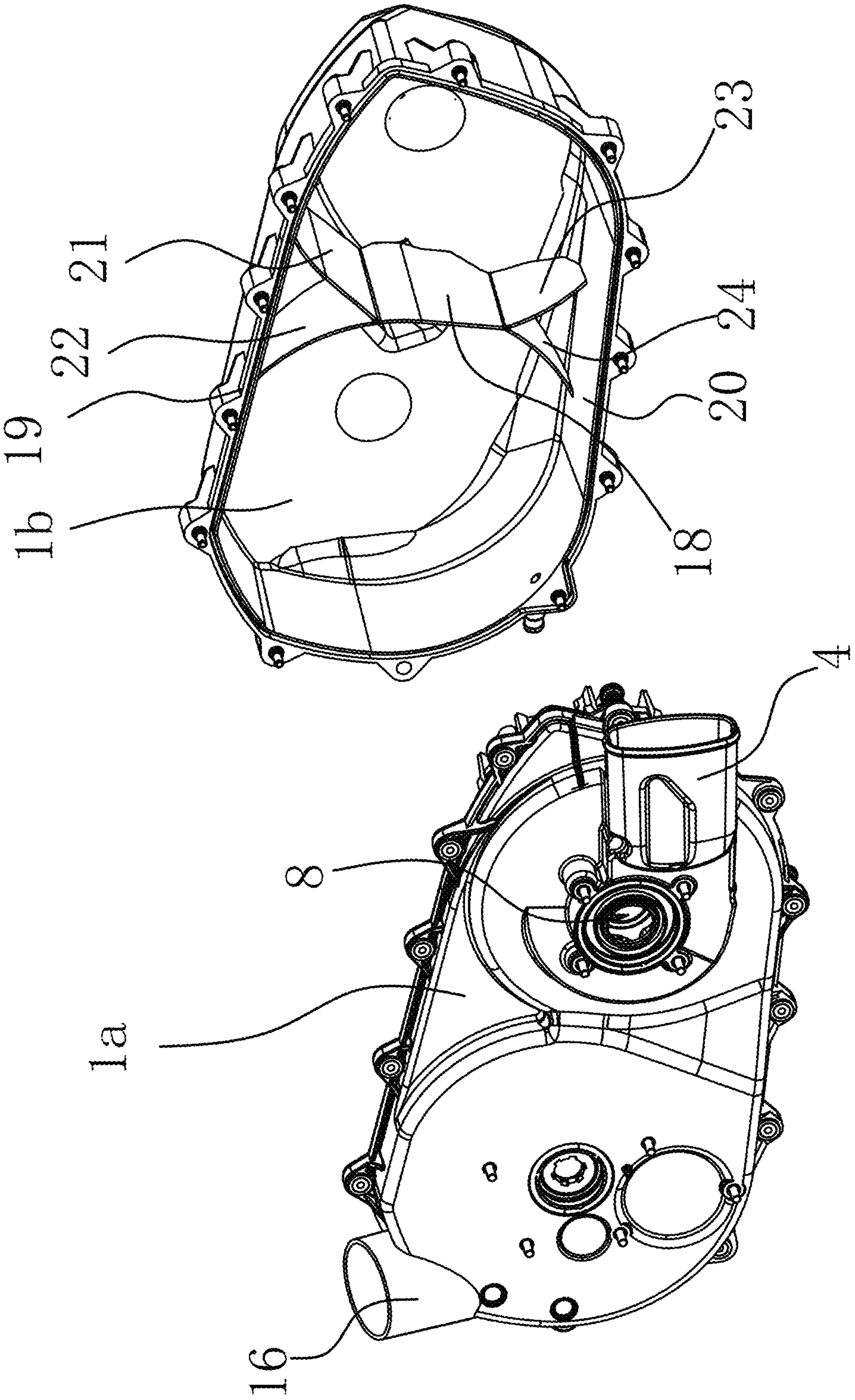
FIG. 7 is an exploded view of some parts of the motorcycle transmission from another perspective.

As shown in FIGS. 4, 6 and 7, the transmission housing 1 is further provided with a driven pulley 12, and the inner side wall of the inner side cover 1*a* is provided with an air guiding protrusion 13 located on an upper side of the labyrinth partition 6 and connected to an upper end of the labyrinth partition 6. The inner side wall of the inner side cover 1*a* is further provided with a rear side groove 14 opposite to the driven pulley 12, and the front side groove 11 and the rear side groove 14 are separated by the air guiding protrusion 13 and the labyrinth partition 6. Specifically, the labyrinth partition 6 is arc-shaped, the front side groove 11 is substantially circular, and the air guiding protrusion 13 and a front side wall of the labyrinth partition 6 are coplanar with a side wall of the front side groove 11. The design enables the air to flow in an arc-shaped trajectory against the side wall of the front side groove 11, so that the air in the front side groove 11 can better form a rotating airflow to further increase the cooling time, so that the driving pulley 2 is better cooled.

As shown in FIG. 7, an air guiding partition 18 opposite to the labyrinth partition 6 is disposed on an inner side wall of the outer side cover 1*b*, an upper flanging 19 is connected to a top edge of the outer side cover 1*b* and a lower flanging 20 is connected to a bottom edge of the outer side cover 1*b*, a first upper arc-shaped partition plate 21 and a second upper arc-shaped partition plate 22 located at a rear side of the first upper arc-shaped partition plate 21 are connected between an upper end of the air guiding partition 18 and the upper flanging 19, a first lower arc-shaped partition plate 23 and a second lower arc-shaped partition plate 24 located at a rear side of the first lower arc-shaped partition plate 23 are connected between a lower end of the air guiding partition 18 and the lower flanging 20, inner concave surfaces of the first upper arc-shaped partition plate 21 and the first lower arc-shaped partition plate 23 are disposed toward a front side of the outer side cover 1*b*, and inner concave surfaces of the second upper arc-shaped partition plate 22 and the second lower arc-shaped partition plate 24 are disposed toward a rear side of the outer side cover 1*b*. The air guiding partition 18 is opposite to the labyrinth partition 6, so the air guiding partition 18 is matched with the labyrinth partition 6, which can increase the wind shielding effect, better block the hot air from flowing back, and make the hot air be discharged from the air outlet pipe 16 as soon as possible, thereby further ensuring a better cooling effect of a device. Meanwhile, on the basis of realizing the blocking function of the air guiding partition 18, since the inner concave surfaces of the first upper arc-shaped partition plate 21 and the first lower arc-shaped partition plate 23 are disposed toward the front side of the outer side cover 1*b*, the wind blocked can also flow against the first upper arc-shaped partition plate 21 and the first lower arc-shaped partition plate 23 to form a rotating airflow, thereby optimizing a wind field, greatly increasing the cooling time and the cooling intensity of the driving pulley 2, and improving the cooling effect. Also, the inner concave surfaces of the second upper arc-shaped partition plate 22 and the second lower arc-shaped partition plate 24 are disposed toward the rear side of the outer side cover 1*b*, so that the cooling intensity of the driven pulley 12 can also be increased and the cooling effect can be improved.

The specific embodiment described herein is merely illustrative of the spirit of the present disclosure. Those skilled in the art to which the present disclosure belongs may make various modifications or supplements or similar substitutions to the specific embodiment described without departing from the spirit of the present disclosure or being beyond the scope defined by the appended claims.

Although the terms such as 1, transmission housing; 1*a*, inner side cover; 1*b*, outer side cover; 2, driving pulley; 21, heat dissipation fan; 3, flow-guiding groove; 4, air inlet pipe; 41, air inlet; 5, flow-guiding slope; 51, head end; 52, tail end; 6, labyrinth partition; 7, air passing opening; 8, first via hole; 9, output shaft; 10, annular projection; 11, front side groove; 12, driven pulley; 13, air guiding protrusion; 14, rear side groove; 15, arc-shaped transition surface; 16, air outlet pipe; 17, water drain joint; 18, air guiding partition; 19, upper flanging; 20, lower flanging; 21, first upper arc-shaped partition plate; 22, second upper arc-shaped partition plate; 23, first lower arc-shaped partition plate; and 24, second lower arc-shaped partition plate are extensively used, the possibility of using other terms is not excluded. These terms are used merely to more conveniently describe and explain the essence of the present disclosure; and the terms are to be construed as any additional limitation, which would depart from the spirit of the present disclosure.

The invention claimed is:

1. A cooling structure for a motorcycle transmission, the transmission comprising a transmission housing, the cooling structure comprising a heat dissipation fan disposed inside the transmission housing, wherein an inner wall of the transmission housing is provided with a flow-guiding groove directly opposite to the heat dissipation fan, an air inlet communicating with the flow-guiding groove is formed in a side wall of a front end of the flow-guiding groove, a groove bottom of the flow-guiding groove is provided with an arc-shaped flow-guiding slope, a head end of the flow-guiding slope is located at the air inlet, and the flow-guiding slope is gradually inclined toward a direction close to the heat dissipation fan from the head end of the flow-guiding slope to a tail end of the flow-guiding slope, the inner wall of the transmission housing is also provided with a labyrinth partition adjacent to a rear side of the flow-guiding groove, and a lower end of the labyrinth partition is spaced from a bottom edge of the transmission housing to form an air passing opening.

2. The cooling structure for a motorcycle transmission as claimed in claim 1, wherein a driving pulley is disposed in the transmission housing, the transmission housing comprises an inner side cover and an outer side cover which are mutually snap-fitted, the heat dissipation fan is disposed on an end face, facing the inner side cover, of the driving pulley, the flow-guiding groove and the air inlet are both located in the inner side cover, the groove bottom of the flow-guiding groove is provided with a first via hole, and an output shaft of an engine extends into the transmission housing through the first via hole and is fixedly connected with the driving pulley.

3. The cooling structure for a motorcycle transmission as claimed in claim 2, wherein the groove bottom of the flow-guiding groove is provided with an annular projection arranged around the first via hole, the flow-guiding slope is arranged around the annular projection, the head end of the flow-guiding slope is located on a lower side of the annular projection, a top of the air inlet is opposite to the annular projection and a bottom of the air inlet is opposite to the head end of the flow-guiding slope.

4. The cooling structure for a motorcycle transmission as claimed in claim 2, wherein a front end of the inner side cover is provided with an air inlet pipe protruding relative to an outer side wall of the inner side cover, and an outlet of the air inlet pipe is the air inlet.

5. The cooling structure for a motorcycle transmission as claimed in claim 2, wherein an inner side wall of the inner side cover is provided with a front side groove, the heat dissipation fan is embedded into the front side groove, the flow-guiding groove is disposed at a middle of a groove bottom of the front side groove, and the tail end of the flow-guiding slope is connected to the groove bottom of the front side groove.

6. The cooling structure for a motorcycle transmission as claimed in claim 5, wherein the transmission housing is further provided with a driven pulley, the inner side wall of the inner side cover is provided with an air guiding protrusion located on an upper side of the labyrinth partition and connected to an upper end of the labyrinth partition, the inner side wall of the inner side cover is further provided with a rear side groove opposite to the driven pulley, and the front side groove and the rear side groove are separated by the air guiding protrusion and the labyrinth partition.

7. The cooling structure for a motorcycle transmission as claimed in claim 6, wherein the labyrinth partition is arc-shaped, the front side groove is substantially circular, and the air guiding protrusion and a front side wall of the labyrinth partition are coplanar with a side wall of the front side groove.

8. The cooling structure for a motorcycle transmission as claimed in claim 4, wherein the head end of the flow-guiding slope protrudes relative to an inner wall of the air inlet pipe, and the flow-guiding slope and the air inlet pipe are connected by an arc-shaped transition surface.

9. The cooling structure for a motorcycle transmission as claimed in claim 1, wherein a top of a rear end of the transmission housing is provided with an air outlet pipe and a bottom of the rear end of the transmission housing is provided with a water drain joint.

10. The cooling structure for a motorcycle transmission as claimed in claim 2, wherein an air guiding partition opposite to the labyrinth partition is disposed on an inner side wall of the outer side cover, an upper flanging is connected to a top edge of the outer side cover and a lower flanging is connected to a bottom edge of the outer side cover, a first upper arc-shaped partition plate and a second upper arc-shaped partition plate located at a rear side of the first upper arc-shaped partition plate are connected between an upper end of the air guiding partition and the upper flanging, a first lower arc-shaped partition plate and a second lower arc-shaped partition plate located at a rear side of the first lower arc-shaped partition plate are connected between a lower end of the air guiding partition and the lower flanging, inner concave surfaces of the first upper arc-shaped partition plate and the first lower arc-shaped partition plate are disposed toward a front side of the outer side cover, and inner concave surfaces of the second upper arc-shaped partition plate and the second lower arc-shaped partition plate are disposed toward a rear side of the outer side cover.

* * * * *